Nov. 15, 1966   J. B. STRICKLAND   3,285,446
METHOD AND APPARATUS FOR PROCESSING A TUBULAR WEB
Filed Feb. 15, 1965

INVENTOR.
JOHN B. STRICKLAND
BY  W. A. Schaich
  & Thomas A. Meehan
ATTORNEYS

United States Patent Office 3,285,446
Patented Nov. 15, 1966

3,285,446
METHOD AND APPARATUS FOR PROCESSING A TUBULAR WEB
John B. Strickland, Valdosta, Ga., assignor to Owens-Illinois Glass Company, a corporation of Ohio
Filed Feb. 15, 1965, Ser. No. 432,560
8 Claims. (Cl. 214—338)

This invention relates to method and apparatus for processing an extended length of a web of circumferentially endless material.

More particularly, this invention relates to method and apparatus for performing a processing step on a longitudinally moving web of material of indefinite length, said web being endless in a direction generally transversely of its length.

More particularly, the invention relates to method and apparatus for circumferentially relocating the side edges of a length of tubing of material from which bags or sacks are to be formed, for example a thermoplastic material such as polyethylene.

The invention has particular utility in the production of plastic bags from a flattened length of tubing when used in conjunction with printing means of any type well known in the art. In such an application, a length of flattened tubing is initially passed through the printing means which serves to print identifying and/or advertising matter on the exterior of one or both of the plies of the web. In such an arrangement, it may be desirable to provide printed matter at a portion of the tubing which will correspond to the edge of the bags to be made therefrom. I have found that such edge printing can be most expeditiously provided by initially providing such printing on the exterior of one of the flat plies of the web and thence, by circumferential relocation of reorientation of the plies with respect to one another, causing certain portions of the printing matter to be transferred to a portion overlapping the side edges of the web. The advantage of this is that there is then provided printing and/or advertising matter at the side edges of the bags which are formed from the tubing in a manner which is considered to be advantageous in the merchandising of the contents of such bags.

In accordance with the present invention, then, the above-noted reorientation of the plies of a length of tubing stock is accomplished by passing the web in succession through first and second sets of opposed pinch rolls which pinch the tubing along the first and second opposed lines of contact extending across the web. In such arrangement, the first and second sets of pinch rolls are angularly displaced from one another with respect to an axis extending generally longitudinally of the direction of the motion of the web. The portion of the web intermediate the first and second sets of pinch rolls is maintained in an inflated condition by introducing a fluid, preferably a compressible fluid such as air, between the plies of the portion of the web therebetween. By virtue of the angular displacement of the second set of pinch rolls with respect to the first set of pinch rolls, the inflated length of tubing will be pre-flattened along side edges which are circumferentially displaced with respect to the side edges of the flattened tubing prior to its passage through the first set of pinch rolls.

Accordingly, therefore, it is an object of the present invention to provide novel and useful apparatus and method for reorienting the plies of a flattened length of tubing in such a manner that the edges of the flattened tubing will be circumferentially relocated. It is a further object of the present invention to provide novel apparatus and method which is useful in circumferentially relocating the side edges of a length of flattened tubing that has been provided with printing matter on at least one of the flattened plies thereof in order to provide certain printing matter along the side edges of bags or sacks which may be thereafter formed from said length of tubing. It is a further object of the present invention to incorporate in such apparatus means for changing the extent of the circumferential relocation of the side edges of a flattened length of tubing.

For further understanding of the present invention, attention is directed to the following portion of the specification, the drawing, and the appended claims.

Figure 1:
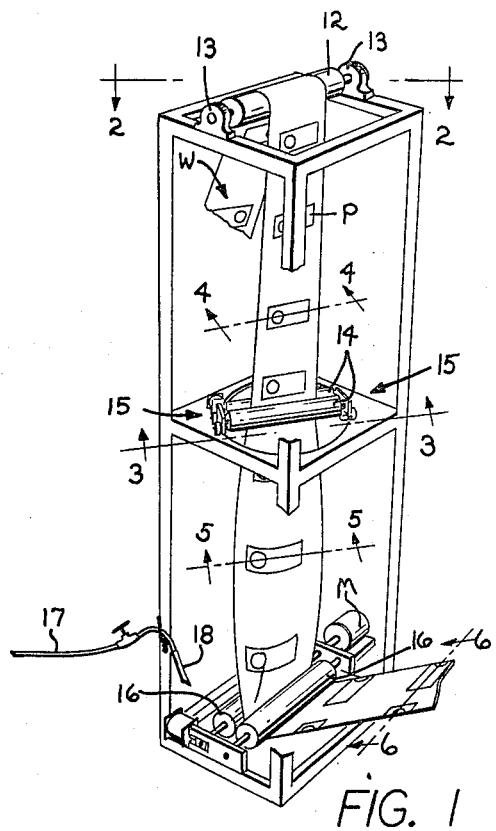
FIG. 1 is a perspective view of apparatus for practicing the present invention with certain portions thereof being partially broken away for the sake clarity.
Figure 4:
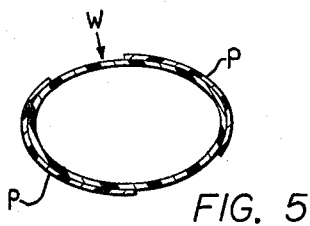
Figure 5:
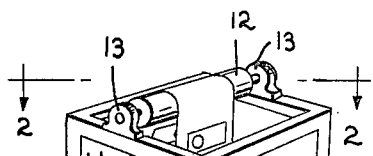
Figure 6:
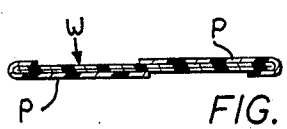
Figure 3:
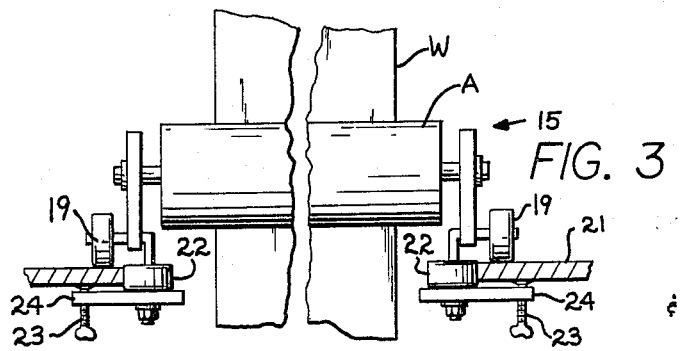

FIG. 3 is a sectional view of a portion of the apparatus of FIG. 1 taken on line 3—3 thereof; and FIG. 4, FIG. 5, and FIG. 6 are sectional views of the length of tubing passing through the apparatus of FIG. 1 taken at successive stages of its processing along lines 4—4, 5—5, and 6—6, respectively, thereof.

Turning now to FIG. 1, there is there-illustrated apparatus for processing a flattened web of circumferentially endless material of indefinite length W comprising a framework indicated generally at 11. The apparatus illustrated in FIG. 1 is shown as being generally vertically disposed, though it is within the contemplation of this invention that such apparatus could be horizontally or otherwise disposed. Also, the apparatus of FIG. 1 is shown as being designed for the processing of a web moving in an up-to-down direction although it is also, of course, obvious that such apparatus could be designed for processing of a web moving in a down-to-up direction.

The apparatus of FIG. 1 comprises, therefore, an inlet roller 12 mounted at the upper extremity of framework 11 in bearing blocks 13. Roller 12 is shown as being an idler roller, although the use of a power driven roller is also contemplated, and serves to direct a moving web W, which comes to it from a previous processing station, such as a printing station, downwardly through succeeding stations of the apparatus of FIG. 1.

Spaced apart from roller 12 in the direction of movement of web W is a first set of opposed counterrotating pinch rolls 14 between which web W is directed. Rolls 14 are mounted in means indicated generally at 15 and extend across web W and serve to pinch it along opposed lines of contact. After passage of the web between rolls 14, web W is eventually passed through a second set of opposed counterrotating pinch rolls 16 which are spaced from rolls 14 the direction of movement of web W. Pinch rolls 16, like pinch rolls 14, extend across web W and serve to engage it along second opposed lines of contact. Due to its circumferential endlessness and its engagement with longitudinally spaced sets of pinch rolls 14 and 16, the portion of web W therebetween is substantially fluid-tight. Thus, after an inflating fluid such as air has been introduced between the plies of the portion of web W intermediate sets of rolls 14 and 16, as by means of fluid line 17 having a pointed tip 18, such portion of the moving web will remain inflated for extended periods of time, particularly after the small hole formed by pointed tip has passed beyond the extent of rolls 16.

Figure 2:
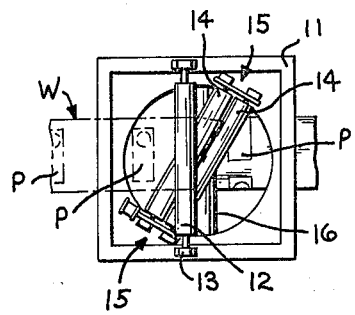
FIG. 2 is a plan view taken on line 2—2 of FIG. 1.

As is clearly shown in FIGS. 1 and 2 of the drawing, the second set of pinch rolls 16 is angularly displaced about an axis extending longitudinally of the direction of motion of web W with respect to the first set of pinch rolls 14. By such a construction, the inflated portion of the web between first and second sets of rolls 14 and 16 will be flattened as it passes through the second set of rolls 16 in such a manner as to circumferentially relocate the side edges of web W from the positions which they occupy prior to the passage of web W through first set of rolls 14. This result, which is accomplished in a manner shown graphically in FIGS. 4–6, is advantageous and desirable in order to relocate or reorient certain portions of web W that have been provided with printing and/or advertising matter, shown generally as printing matter P which may be provided by printing means the details of which are not within the scope of this invention. Web W passes through such printing means prior to its passage through the apparatus of the present invention. For the sake of convenience, such printing means are normally utilized to provide printing matter at locations along the moving web intermediate the edges of the flattened plies thereof.

In the manufacture of bags or sacks from web W, however, it is frequently desirable that the edges of such bags, whether ultimately of the lay-flat or gusseted type, incorporate certain portions of such printing matter P therealong. By circumferentially relocating or reorienting the plies of web W in accordance with the present invention, such printing matter P may be very readily caused to overlap the side edges of web W in such a manner that such overlapping of printing matter will naturally be disposed along the edges of the bags manufactured from web W.

In the practice of the present invention, the degree of angular displacement of rolls 16 from rolls 14 necessary to provide a desired amount of circumferential relocation of printed matter P may be computed by the formula:

$$\theta = 180 \frac{x}{y}$$

wherein $\theta$ is the angle of displacement between rolls 14 and rolls 16, $y$ is the width, in inches, of the flat web W, and $x$ is the desired distance, in inches, between the original and final lines of fold between the plies of flattened web W.

From the foregoing formula, it can be seen that it may be desirable to vary the angle of displacement between rolls 14 and rolls 16 in order to provide different degrees of circumferential relocation of the side rolls of the web W or when it is desired to process webs of a greater or lesser width. In accordance with a further refinement of the present invention, therefore, means are provided to vary the angular orientation of at least one of the sets of rolls 14 and 16 about an axis extending longitudinally of the direction of motion of the web W in order to change the relative angle of displacement between the sets of pinch rolls. In the illustrated embodiment of the invention, such means takes the form of rotating means for rotating roller support means 15 about the longitudinal axis of web W. Such rotating means comprises rollers 19 attached to means 15 adapted to rotate on a horizontal surface of a horizontal annular plate member 21 of framework 11 and additional roller means 22 adapted to rotate along the inner vertical edge of plate 21. Means 15 is further provided with locking means comprising a threaded member 23 threading through a plate 24 carried by the axes of wheels 22. When locking screw 23 is tightened, it bottoms against the side of plate 21 opposite from the side engaged by rollers 19 thereby locking rolls 14 in a given angular position with respect to the longitudinal axis of web W.

It is, of course, obvious that it is necessary to provide drive means to effect advancement of web W through the various stations of the foregoing apparatus. Such drive means need not be part of such apparatus, per se, in that they may be associated with other processing stations located in line with the foregoing apparatus, as in the case of power driven coiling apparatus at the end of the line. However, such drive means can be considered to be represented by a motor M shown as rotatingly driving one of rolls 16.

The best mode known to me to carry out this invention has been described above in terms that are believed to be sufficiently full, clear, concise and exact to enable any person skilled in the art to make and use the same. It is to be understood, however, that I contemplate that certain modifications of the above-described mode of practicing the invention can be made by a skilled artisan without departing from the scope of the invention which is defined only by the appended claims.

I claim:

1. Apparatus for processing a web comprising two thin elongate layers of material connected to one another adjacent their side edges to form a film which is endless in a direction generally transversely of the web apparatus comprising, in combination: means for advancing said web longitudinally of itself; first pinch means for pinching the moving web along opposed lines of contact disposed generally transversely of the direction of motion of the web; second pinch means longitudinally spaced from the first means in the direction of motion of the web for pinching the moving web along second opposed lines of contact disposed generally transversely of the direction of motion of the web, said second pinch means being so disposed with respect to the first pinch means that the second opposed lines of contact are angularly displaced from said first opposed lines of contact about an axis extending generally longitudinally of the direction of motion of the web; and means for introducing fluid between the layers of the web intermediate the first and second opposed lines of contact to inflate the portion of the web therebetween, whereby the side edges of the web will be circumferentially relocated with respect to the location of the side edges prior to the passage of the web through said first and second pinch means.

2. Apparatus in accordance with claim 1 and further comprising means to adjust the position of one of the pinch means to change the angle of displacement of the second opposed lines of contact with respect to the first opposed lines of contact.

3. Apparatus for processing a web comprising two thin elongate layers connected to one another adjacent their side edges to form film which is endless in a direction generally transversely of the longitudinal axis of the web, said apparatus comprising, in combination: means for advancing said web longitudinally of itself; a first set of opposed pinch rolls for pinching the moving web along opposed lines of contact extending across the web; a second set of opposed pinch rolls longitudinally spaced from the first set of pinch rolls in the direction of motion of the web for pinching the moving web along second opposed lines extending across the web, said second set of pinch rolls being angularly displaced with respect to the first set of pinch rolls about an axis extending generally longitudinally in the direction of motion of the web; and means for introducing fluid between the layers of the web intermediate the first and second sets of pinch rolls to inflate the portion of the web therebetween, whereby to circumferentially relocate the side edges of the web.

4. Apparatus in accordance with claim 3 and further comprising: means to adjust the angle of displacement of the second set of pinch rolls with respect to the first set of pinch rolls to change the extent of the relocation of said side edges.

5. The method of processing a web comprising two elongate thin layers of material connected at their side edges to form a film which is endless in a direction generally transversely of the web, said method comprising the steps of: advancing said web generally longitudinally of itself between first and second stations spaced apart from one another in the direction of motion of the web; pinching said web at the first station along first opposed lines of contact extending across the strip; pinching the web at the second station along second opposed lines of contact extending across the strip, said second opposed lines of contact being angularly displaced from the first opposed lines of contact about an axis extending generally longitudinally of the direction of motion of the web; and maintaining a fluid between the layers of the web intermediate the first and second opposed lines of contact to maintain the portion of the web therebetween in an inflated state, whereby to relocate the position of the side edges of the web during its passages through the first and second stations.

6. The method of processing a web comprising two elongate thin layers of material connected to one another adjacent their side edges to form a film which is endless in a direction generally transversely of said side edges, said method comprising, the steps of: advancing a section of indefinite length of said web longitudinally of itself in succession through first and second stations spaced apart from one another in the direction of motion of the web; pinching the moving web along first opposed lines of contact extending across the strip at the first station; pinching the web along second opposed lines of contact extending across the strip at the second station, the second opposed lines of contact being displaced angularly from the first opposed lines of contact about an axis extending generally longitudinally of the direction of motion of the web; and maintaining a compressible fluid between the layers of the web intermediate the first and second opposed lines of contact to maintain the portion of the web therebetween in an inflated state, whereby to relocate the side edges of the strip as it passes through the first and second stations.

7. The method in accordance with claim 6 wherein at least one of said layers of said web is provided with printing matter between its side edges prior to the passage of the web through the first station and wherein the second opposed lines of contact is disposed at a suitable angle with respect to the first opposed lines of contact to relocate the printed matter so that it overlaps one side edge of said layer after said web passes from the second station.

8. The method in accordance with claim 6 comprising providing first and second sets of opposed counterrotating rolls for pinching the web along the first and second opposed lines of contact, respectively.

References Cited by the Examiner
UNITED STATES PATENTS
3,185,044   5/1965   Ahlbrandt _____ 93—20

M. HENSON WOOD, Jr., *Primary Examiner.*

J. N. ERLICH, *Assistant Examiner.*